United States Patent [19]

Miura et al.

[11] Patent Number: 5,664,651
[45] Date of Patent: Sep. 9, 1997

[54] SHOCK ABSORBER SHAFT SEAL

[75] Inventors: Takeshi Miura; Hideko Munekata, both of Fukushima, Japan

[73] Assignee: NOK Corporation, Tokyo, Japan

[21] Appl. No.: 570,433

[22] Filed: Dec. 11, 1995

[30] Foreign Application Priority Data

Dec. 15, 1994 [JP] Japan .................. 6-332895

[51] Int. Cl.⁶ .................................................. F16F 9/36
[52] U.S. Cl. .................. 188/322.17; 277/208; 277/215
[58] Field of Search .................. 188/322.17, 322.16; 277/207 R, 208, 209, 210, 211, 215

[56] References Cited

U.S. PATENT DOCUMENTS

| | | | |
|---|---|---|---|
| 4,155,560 | 5/1979 | Repella | 277/208 X |
| 4,560,177 | 12/1985 | Riley, Jr. | |
| 5,507,505 | 4/1996 | Von-Arndt et al. | 277/208 |

FOREIGN PATENT DOCUMENTS 1-124468  8/1989  Japan .

*Primary Examiner*—Lee W. Young
*Attorney, Agent, or Firm*—Jacobson, Price, Holman & Stern, PLLC

[57] ABSTRACT

A shaft seal suitable for use in gas-filled shock absorbers. The shaft seal (20) includes an annular elastomeric sealing member (34) having a first sealing lip (46) and a second sealing lip (48). The first sealing lip (46) has a frustoconical air-side sealing surface (54) and a series of spaced annular projections (66) contiguous thereto. The second sealing lip (48) has a frustoconical air-side sealing surface (62) and a series of spaced annular grooves (70) contiguous thereto. The first sealing lip (46) provides an excellent lubrication capability whereas the second sealing lip (48) provides a high sealing capability.

9 Claims, 2 Drawing Sheets

SHOCK ABSORBER SHAFT SEAL

BACKGROUND OF THE INVENTION

1. Field of the Invention

The present invention relates broadly to fluid seals and, more particularly, to fluid seals which may be suitably used in hydraulic shock absorbers wherein a gas under pressure is charged.

2. Description of the Prior Art

As is well-known, automotive suspension systems are generally equipped with hydraulic shock absorbers adapted to dampen the shock as the wheel hits a bump and to attenuate oscillation of the suspension springs. During operation of the shock absorbers, the hydraulic fluid absorbs the energy applied to the suspension systems and converts it into heat. The hydraulic fluid also undergoes strong agitation as it flows across orifice of the valved piston. Under severe operating conditions, heat and agitation lead to formation of vapor bubbles which would impair the performance of the shock absorbers.

To suppress the formation of or reduce the effect of vapor bubbles, modern shock absorbers are generally charged with an inactive gas, such as nitrogen gas, which is under pressure in the range of 4–6 kg/cm$^2$.

In a gas-filled shock absorber, a fluid seal for sealing the piston rod or shaft relative to the shock absorber housing is constantly subjected to the gas pressure. Accordingly, an essential requirement for the shaft seals for gas-filled shock absorber applications is to effectively prevent leakage of the hydraulic fluid as well as gas under pressure throughout the service life of the shock absorbers.

The shock absorbers are also subjected during operation to a substantial lateral thrust. In particular, a severe lateral thrust is encountered in the MacPherson strut type suspension systems. The lateral thrust is increased with increasing speed performance of the automobiles. Although the piston rod of the shock absorber is guided by a rigid guide supported by the housing, the lateral thrust causes the piston rod to offset to some degree relative to the housing. This brings about an uneven sealing pressure distribution over the inner circumference of the shaft seal. In the region where the sealing pressure is reduced, there is a likelihood of leakage of the hydraulic fluid and gas under pressure.

It is therefore an object of the present invention to provide a shaft seal having a high degree of sealing capability.

Another important requirement for the shaft seals for shock absorber applications is somewhat opposing. It is desirable that the shaft seals undergo reduced wear and drag (dynamic friction).

Accordingly, another object of the invention is to provide a fluid seal which is capable of being adequately lubricated by the hydraulic fluid without sacrificing the sealing capability.

SUMMARY OF THE INVENTION

According to the invention, a fluid seal for a gas-filled hydraulic shock absorber comprises a rigid annular casing and an annular elastomeric sealing member bonded thereto. The elastomeric sealing member has a first or primary sealing lip and a second or auxiliary sealing lip each having a sealing edge defined by a frustoconical oil-side surface and a frustoconical air-side sealing surface.

The feature of the invention is that the first sealing lip has a series of spaced annular projections contiguous to and axially outwardly of the air-side sealing surface, whereas the second sealing lip has a series of spaced annular grooves contiguous to and axially outwardly of the air-side sealing surface.

The annular projections of the first sealing lip is the free state thereof are configured to project radially inwardly of the plane of the air-side sealing surface of the first sealing lip in such a manner that the bottom of grooves formed between the annular projections is substantially coplanar with the plane of the air-side sealing surface of the first sealing lip.

In contrast, the annular grooves of the second sealing lip in the free state thereof are configured to lie radially outwardly of the plane of the air-side sealing surface of the second sealing lip.

In use, the annular projections of the first sealing lip are brought into sealing engagement with the shaft to form a series of oil retaining grooves therebetween. When engaged with the shaft, the first annular projection immediately adjacent the air-side sealing surface of the first sealing lip operates to raise a part of the air-side sealing surface of the first sealing lip radially outwardly away from the shaft. This reduces the dynamic friction of the first sealing lip and precludes the first sealing edge from overly scraping or wiping the lubricant film.

In contrast, the air-side sealing surface of the second sealing lip is brought into snug sealing engagement with the shaft throughout the entire axial extent of the sealing surface. As a result, the second sealing edge intensively scrapes the lubricant film and returns the lubricant back to the first sealing lip.

The second sealing lip also functions to provide a support for the first sealing lip and assist the first sealing lip in following any shaft eccentricity due to lateral thrust.

These features and advantages of the invention, as well as other features and advantages thereof, will become apparent from the following description.

DESCRIPTION OF THE PREFERRED EMBODIMENT

Figure 1:
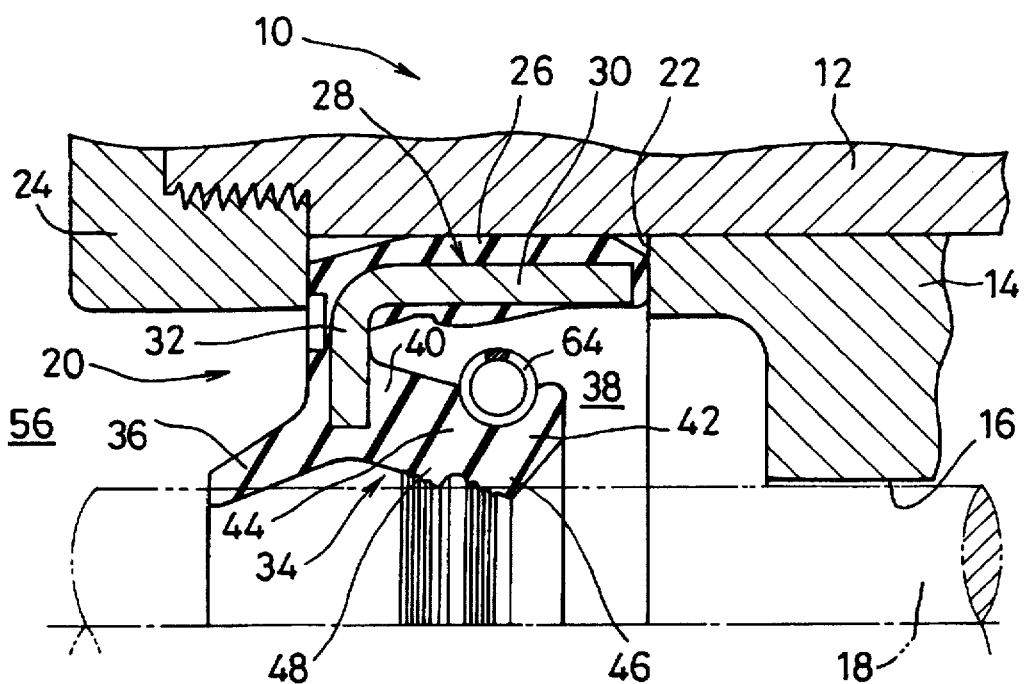
FIG. 1 is a fragmentary cross-sectional view of a shaft seal embodying the invention as incorporated into a shock absorber housing, with the piston rod of the shock absorber being removed to show the free state cross-section of the sealing member.

Referring to FIG. 1, the shock absorber, designated generally by the reference numeral 10, may be of any conventional type and may include a housing or outer tube 12 in which an annular piston rod guide 14 is firmly secured in the conventional manner. The rod guide 14 has an axial bore 16 which slidably supports a piston rod 18 with a small clearance. The piston rod 18 is connected to a conventional valved piston, not shown. As the shock absorber 10 is of the conventional one, the structure thereof need not be described in any detail.

A shaft seal according to the invention, indicated generally by the reference numeral 20, is fluid tightly mounted within the housing 12. In the illustrated embodiment, the shaft seal 20 is fluid tightly and firmly sandwiched between a shoulder 22 of the rod guide 14 and a retaining cap 24 screwed into the threaded bore of the housing 12.

The shaft seal 20 includes an annular molded body 26 of an elastomeric material and an annular metallic casing 28 insert molded within the body 26. In the illustrated embodiment, the casing 28 has an L-shaped cross-section and includes an outer tubular portion 30 and a radial flange 32.

The shaft seal 20 further includes an annular elastomeric sealing member 34 and an annular dust sealing lip 36 bonded, respectively, to the radial flange 32 of the casing 28.

In the free or relaxed state, the sealing member 34 is somewhat frustoconical in shape as shown and tapers generally toward the oil side indicated by the reference numeral 38. The sealing member 34 is configured to include an axially outer end 40 bonded to the flange 32, an axially inner end or free end 42, and a tapered intermediate section 44 connecting the end portions 40 and 42.

Figure 2:
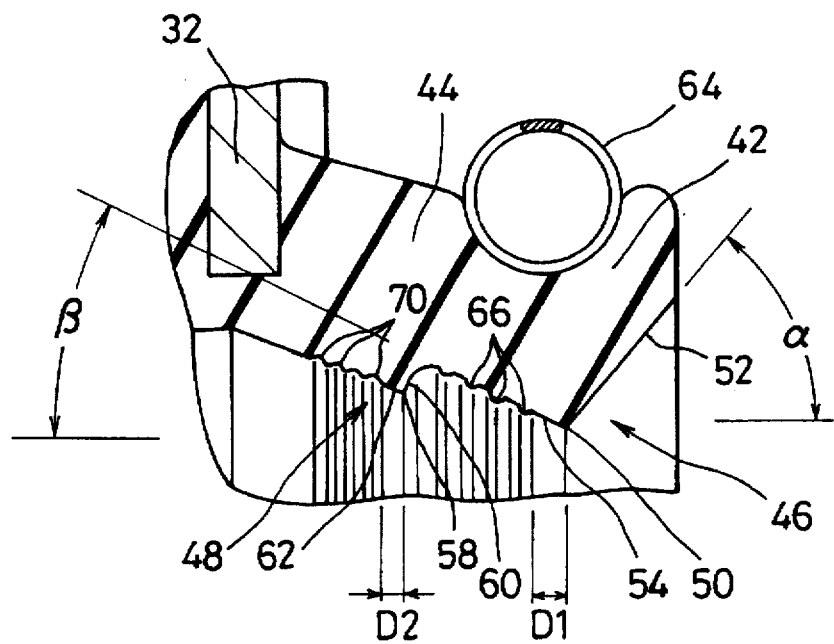
FIG. 2 is an enlarged fragmentary cross-sectional view showing a part of the sealing member shown in FIG. 1.

As shown enlarged in FIG. 2, the radially inner surface of the sealing member 34 is configured to form a first or primary sealing lip 46 situated at the free end region 42 and a second or auxiliary sealing lip 48 located at the intermediate section 44.

The first sealing lip 46 has a sealing edge 50 defined by a frustoconical oil-side surface 52 and a frustoconical air-side sealing surface 54. In this regard, the terms "oil-side" and "air-side" refer, respectively, to being situated closer to the oil side 38 and the air side 56 indicated in FIG. 1. The angle alpha formed between the oil-side surface 52 and the axis of the piston rod 18 is greater than the angle beta that the air-side sealing surface 54 forms with the rod axis, as will be apparent from FIG. 2. Preferably, the angle alpha is about 50°.

Similarly, the second sealing lip 48 has a sealing edge 58 defined by a frustoconical oil-side surface 60 and a frustoconical air-side sealing surface 62. The angle between the oil-side surface 60 and the piston rod axis is similarly greater than the angle between the air-side sealing surface 62 and the rod axis.

In the free state of the sealing member 34, the inner diameter of the first sealing edge 50 is smaller than the inner diameter of the second sealing edge 58. The sealing member 34 may be so sized and configured that in the free state thereof the inner diameter of the first sealing edge 50 is smaller than the diameter of the piston rod 18 to be sealed and that the inner diameter of the second sealing edge 58 is roughly equal to the piston rod diameter as will be apparent from FIG. 1.

As a nitrogen gas under pressure is filled within the housing 12 of the shock absorber 10, the intermediate portion 44 and the axially inner section 42 of the sealing member 34 will be deformed radially inwardly under the gas pressure to bring both of the first and second sealing lips 46 and 48 into sealing engagement with the piston rod 18. The first sealing lip 46 is backed up by a garter spring 64 fitted in the conventional manner in an annular groove formed on the outer periphery of the inner end section 42.

Figure 3A:
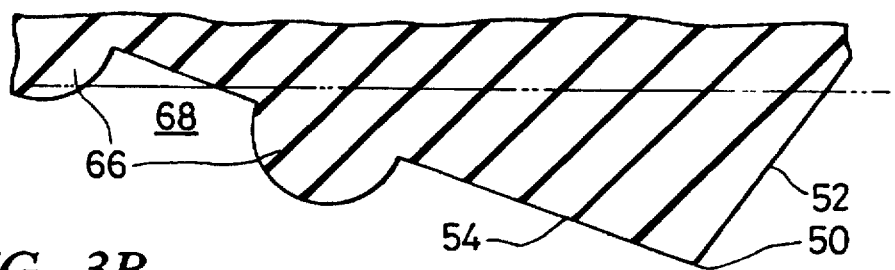
FIGS. 3A and 3B are fragmentary cross-sectional views in a greatly enlarged scale showing the first sealing lip of the sealing member as being in the free state thereof and as being engaged with the piston rod, respectively, with FIG. 3B showing at the lower part thereof the sealing pressure distribution along the piston rod; and, FIGS. 4A and 4B are fragmentary cross-sectional views in a greatly enlarged scale showing the second sealing lip of the sealing member as being in the free state thereof and as being engaged with the piston rod, respectively, with FIG. 4B similarly showing at the lower part thereof the sealing pressure distribution.
Figure 4A:
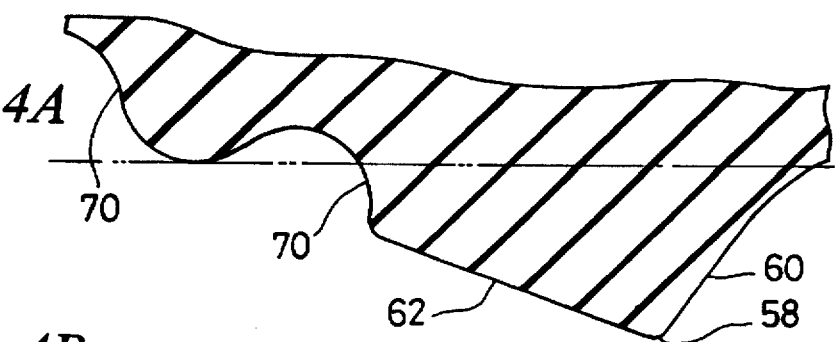

As best shown in FIGS. 3A and 4A, the first sealing edge 50 is shaped in the form of a sharply cut edge, in contrast to the second sealing edge 58 having a somewhat rounded cross-section.

As shown in FIGS. 2 and 3A, the first sealing lip 46 is provided with a series of spaced annular projections 66 contiguous to and axially outwardly of the air-side sealing surface 54. In the illustrated embodiment, four such annular projections are provided so that three annular grooves 68 are formed therebetween. The axial distance D1 between the sealing edge 50 and the axially innermost projection 66, i.e., the axial extent of the first sealing surface 54, is preferably 0.1–0.6 mm.

Each of the projections 66 is designed and configured such that in the free state it projects radially inwardly of the frustoconical plane passing the air-side sealing surface 54. The bottom of the grooves 68 is substantially coplanar with the plane of the first sealing surface 54.

As shown in FIGS. 2 and 4A, the second sealing lip 48 is formed with a series of spaced annular grooves 70 contiguous to and axially outwardly of the air-side sealing surface 62. As best shown in FIG. 4A, each of the grooves 70 is configured such that in the free state it lies radially outwardly of the frustoconical plane passing the air-side sealing surface 62. The axial distance D2 between the sealing edge 58 and the axially innermost groove 70 is preferably 0.2–0.4 mm.

In use, the first sealing lip 46 backed up by the garter spring 64 resiliently engages the piston rod 18. In addition, the gas under pressure charged within the shock absorber housing 12 brings the first and second sealing lips 46 and 48 into sealing engagement with the piston rod 18 as mentioned before.

In the first sealing lip 46, the compressive force exerted on the first sealing lip 46 will be transferred primarily to the air-side sealing surface 54. However, since the projections 66 are protruded radially inwardly of the plane of the sealing surface 54, the compressive force will be distributed in part over the annular projections 66 as indicated schematically by the pressure distribution curve 72 shown in the lower part of FIG. 3B.

Figure 3B:
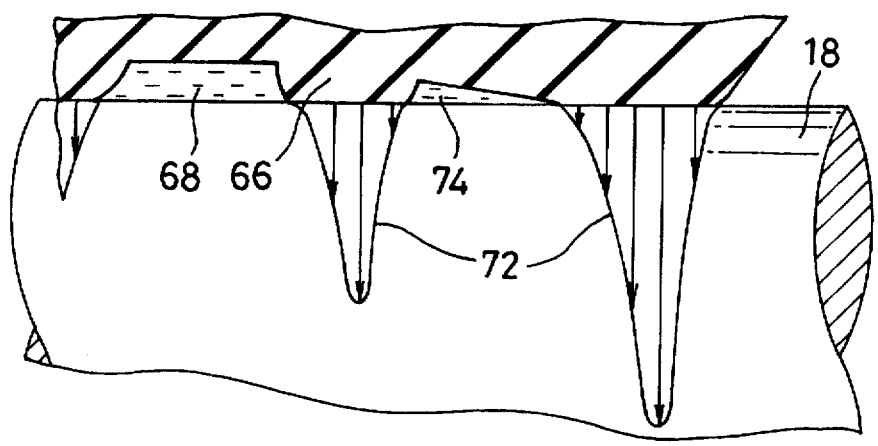

The annular projections 66 will be flattened to some degree against the piston rod 18 as shown. However, since the axially innermost projection 66 would not be completely compressed or flattened, the axially outer part of the air-side sealing surface 54 will be slightly raised radially outwardly away from the piston rod 18 as schematically shown in FIG. 3B to form an oil retaining groove 74. Compression of the innermost projection 66 also serves to reduce the contact area as well as the sealing pressure of the sealing surface 54. As shown in FIG. 3B by the curve 72, the first sealing surface 54 will undergo a high sealing pressure only for a relatively narrow band.

As a result, a film of hydraulic fluid of adequate thickness will be retained over the outer periphery of the piston rod 18 to sufficiently lubricate the first sealing lip 46 as the piston rod 18 reciprocates relative to the housing 12. This reduces wear and dynamic friction of the first sealing lip 46. Any excessive amount of hydraulic fluid tending to leak through the first sealing edge 50 will be returned back to the oil side 38 by the scraping or wiping action of the first sealing edge 50.

Figure 4B:
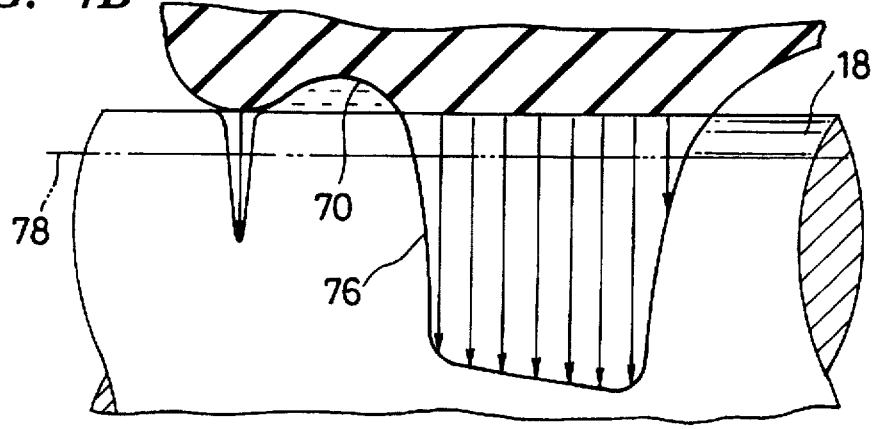

In contrast, in the second sealing lip 48, the air-side sealing surface 62 will be brought into sealing engagement with the piston rod 18 throughout the entire axial extent thereof as shown in FIG. 4B, since the grooves 70 are formed to lie radially outwardly of the plane passing the air-side sealing surface 62 and, hence, would not preclude the sealing surface 62 from contacting the outer periphery of the rod 18 throughout the entire axial extent.

Accordingly, the compression force exerted on the second sealing lip 48 will be applied mostly upon the second sealing surface 62 as shown by the pressure distribution curve 76 indicated in the lower part of FIG. 4B. The sealing pressure exerted on the second sealing surface 62 is substantially high and uniform over the entire axial extent as shown by the curve 76.

As in this manner the second sealing surface 62 is brought into sealing engagement with the piston rod 18 for the entire axial extent thereof under a substantially uniform high sealing pressure, release of hydraulic fluid and gas under pressure will be effectively prevented.

In the event that the piston rod 18 is laterally displaced or flexed due to the lateral thrust exerted on the shock absorber 10 causing the outer periphery of the rod 18 to be offset downward as viewed in FIG. 4B as shown by the dotted line 78, the sealing pressure developed by the second sealing surface 62 will be reduced at the circumferential region which is opposite to the direction of lateral displacement. However, the second sealing surface 62 will be kept in good sealing contact with the piston rod 18 to prevent any leakage of fluid and gas because the second sealing surface 62 has a wide contact area as compared with the first sealing surface 54 and since the compression force acting upon the second sealing lip 48 is applied mostly upon the second sealing surface 62. In addition, the second sealing lip 48 provides a support for the first sealing lip 46 and assist it to follow any eccentricity or lateral offset of the piston rod 18.

In summary, high sealing capability of the second sealing lip 48 concerts with high lubricating capability of the first sealing lip 46 to realize a shaft seal which, as a whole, is operable to effectively prevent fluid leakage without wear for a prolonged period. The present inventors have conducted a comparative experiment wherein the shaft seal according to the invention and the conventional shaft seal were tested for fluid leakage. After 300 cycles of piston rod stroke under a gas pressure of 3 kg/cm$^2$, the amount of fluid leakage observed with the shaft seal according to the invention was 0.001 g, in contrast to 0.008 g encountered with the conventional shaft seal.

While the present invention has been described herein with reference to the specific embodiment thereof, it is contemplated that the present invention is not limited thereby and various changes and modifications may be made therein for those skilled in the art without departing from the scope of the invention.

What is claimed is:

1. A fluid seal for use in a gas-filed hydraulic shock absorber having a shaft reciprocable relative to a housing in which a gas under pressure is charged, said fluid seal comprising:

a rigid annular casing for securing said fluid seal to said housing in a fluid-tight manner; and, an annular elastomeric sealing member bonded at an axially outer end thereof to said casing, said sealing member being configured to include a free end extending axially inwardly of said casing;

said sealing member having first and second sealing lips for sealingly engaging said shaft, said first sealing lip being located at said free end and said second sealing lip being located between said first sealing lip and said casing;

each of said first and second sealing lips having a sealing edge defined in a free state thereof by a frustoconical oil-side surface and a frustoconical air-side sealing surface;

said first sealing lip having a series of spaced annular projections contiguous to and axially outwardly of said air-side sealing surface of said first sealing lip to form in use a series of oil retaining grooves therebetween;

said projections in a free state thereof projecting radially inwardly of the plane of said air-side sealing surface of said first sealing lip in such a manner that the bottom of said grooves is substantially coplanar with the plane of said air-side sealing surface of said first sealing lip;

the first projection in said series of projections immediately adjacent said air-side sealing surface being arranged so that, when engaged with said shaft, said first projection raises a part of said air-side sealing surface radially outwardly away from said shaft;

said second sealing lip having a series of spaced annular grooves contiguous to and axially outwardly of said air-side sealing surface of said second sealing lip;

said annular grooves in the free state thereof being configured to lie radially outwardly of the plane of said air-side sealing surface of said second sealing lip to ensure that said air-side sealing surface of said second sealing lip is brought into sealing engagement with said shaft throughout the entire extent of said air-side sealing surface of said second sealing lip whenever said second sealing lip is located around said shaft.

2. The fluid seal according to claim 1, wherein the angle that said oil-side surface of said first and second sealing lips forms with a central axis of said fluid seal is larger than the angle that said air-side sealing surface of said first and second sealing lips forms with said central axis of said shaft.

3. The fluid seal according to claim 2, wherein the angle that said oil-side surface of said first and second sealing lips forms with said central axis is about 50°.

4. The fluid seal according to claim 1, wherein the inner diameter of said sealing edge of said first sealing lip in the free state thereof is smaller than the inner diameter of said sealing edge of said second sealing lip.

5. The fluid seal according to claim 1, wherein the axial extent of said frustoconical air-side sealing surface of said first sealing lip is 0.1–0.6 mm.

6. The fluid seal according to claim 1, wherein the axial extent of said frustoconical air-side sealing surface of said second sealing lip is 0.2–0.4 mm.

7. The fluid seal according to claim 1, wherein said sealing edge of said first sealing lip is configured to form a sharp edge.

8. The fluid seal according to claim 1, wherein said sealing edge of said second sealing lip is configured to form a rounded edge.

9. In combination with a gas-filled hydraulic shock absorber having a shaft reciprocable relative to a housing wherein a gas under pressure is charged, a fluid seal comprising:

a rigid annular casing fluid tightly secured to said housing; and, an annular elastomeric sealing member bonded at an axially outer end thereof to said casing, said sealing member being configured to include another end extending axially inwardly of said casing;

said sealing member having first and second sealing lips sealingly engaged with said shaft, said first sealing lip being located at said another end and said second sealing lip being located between said first sealing lip and said casing;

each of said first and second sealing lips having a sealing edge defined in a free state thereof by a frustoconical oil-side surface and a frustoconical air-side sealing surface;

said first sealing lip having a series of spaced annular projections contiguous to and axially outwardly of said air-side sealing surface of said first sealing lip to form a series of oil retaining grooves therebetween;

said projections in the free state thereof projecting radially inwardly of the plane of said air-side sealing surface of said first sealing lip in such a manner that the bottom of said grooves is substantially coplanar with the plane of said air-side sealing surface of said first sealing lip;

the first projection in said series of projections immediately adjacent said air-side sealing surface being in sealing engagement with said shaft thereby to raise a part of said air-side sealing surface radially outwardly away from said shaft;

said second sealing lip having a series of spaced annular grooves contiguous to and axially outwardly of said air-side sealing surface of said second sealing lip;

said annular grooves in a free state thereof being configured to lie radially outwardly of the plane of said air-side sealing surface of said second sealing lip to ensure that said air-side sealing surface of said second sealing lip is brought into sealing engagement with said shaft throughout the entire extent of said air-side sealing surface of said second sealing lip.

* * * * *